Patented June 22, 1926.

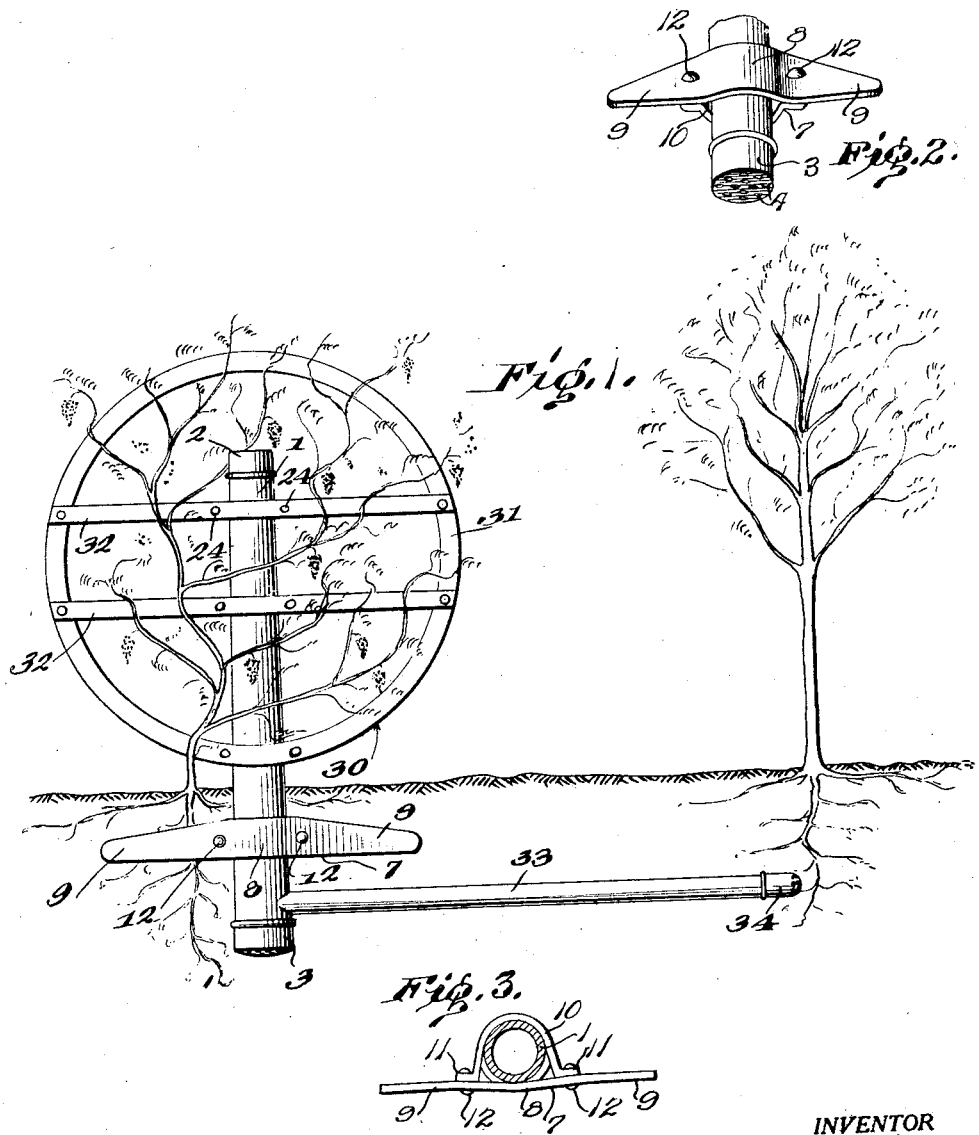

1,589,400

UNITED STATES PATENT OFFICE.

HENRY ANDREW KLINGLESMITH, OF NEWTON, KANSAS.

IRRIGATING DEVICE.

Application filed October 26, 1923. Serial No. 671,046.

My invention relates to the irrigation of plants, such as young trees, shrubbery, flowers, and the like, and it consists in the combinations, constructions and arrangements herein described and claimed.

An object of the invention is to provide an irrigating device which is adapted to discharge water in close proximity to the roots of plants and beneath the surface of the earth.

A further object of the invention is to provide an irrigating device which is adapted by its construction to serve as a support for a suitable superstructure for supporting the branches of the plant to which the water is being supplied.

A further object of the invention is to provide a device of the character described which is simple in construction, easy of application and thoroughly practical commercially.

Other objects and advantages of the invention will be apparent from the following description, considered in conjunction with the accompanying drawings, in which—

Figure 1 is a view, mainly in side elevation, showing an irrigating device embodying the invention in use.

Figure 2 is a slightly enlarged fragmentary perspective view of a portion of the irrigating device, showing an anchor member thereon.

Figure 3 is a horizontal section through the structure exhibited in Figure 2, the view being taken on a plane above the anchor member.

As is well known, water discharged upon the surface of the ground adjacent to the plants frequently fails to penetrate into the ground sufficiently far to reach the roots of the plant. Consequently the plants are not appreciably benefited by the moisture discharged on the surface of the ground.

My invention overcomes this objectionable feature of sprinklers by providing means for discharging the liquid beneath the surface of the earth and in position to be absorbed by the roots of the plants or plant which are to be irrigated.

In Figure 1, I show an embodiment of the invention which comprises a receptacle 1 having the form of an upstanding tubular member closed at its upper end by a removable imperforate cap 2 and at its lower end by a cap 3 which has a plurality of small discharge orifices 4 formed therein, as clearly shown. The cap 3 also may be removable and the caps 2 and 3 normally are retained in position on the upstanding member 1 in any suitable known manner, as by having a friction tight fit or a screw threaded connection with the end portions of the upstanding member. The upstanding tubular member 1 is disposed adjacent to a plant, which may be a young tree, the arrangement being such that the lower end portion of the upstanding tubular member extends below the surface of the earth to the depth of at least some of the roots of the plant. The upstanding tubular member 1 is held against displacement from the position shown in Figure 1 by the engagement of an anchor member 7 with the earth. The anchor member 7 comprises a member having an intermediate portion 8 which constitutes a clamp section and laterally extending wings or end portions 9 which are merged into the intermediate portion. A substantially U-shaped member 10 is complemental to the clamp section 8 and is adapted to cooperate with the latter to embrace the tubular member 1. The clamp member 10 has end attaching portions indicated at 11 provided with apertures in register with openings through the clamp section 8 and through which attaching devices such as the bolts indicated at 12 may be inserted to secure the clamp member 10 to the clamp section 8 and to secure the anchor as a whole to the upstanding tubular member 1 in a desirable position along the latter. The anchor 7 of course is secured to the upstanding tubular member 1 in position to be imbedded in the ground and the upstanding tubular member 1 thus will be firmly held against displacement from the position illustrated in Figure 1.

A trellis designated generally 30 may be carried by the upstanding tubular member 1 in position to support the branches of the plant or plants with which the device is associated. The trellis 30 includes cross bars 32 and an annular bar-member 31. Each of the cross-bars 32 includes an intermediate portion which is similar to the clamp section 8 of the anchor 7 and is adapted to cooperate with a clamp member not shown, complemental thereto and similar to the U-shaped member 10 and with fastening devices such as the bolts indicated at 24 to secure the cross bar to the upstanding tubular member 1.

The upstanding tubular member 1 is provided adjacent to its lower or discharge end with a branch conduit 33. The latter extends beneath the surface of the earth laterally of the lower end of the upstanding tubular member 1 and terminates at its free end adjacent to the roots of a plant which may be located a considerable distance from the plant to which the upstanding member 30 is adjacent. The branch 33 is provided at its free end with an apertured cap 34 through which liquid passes into the earth.

From the foregoing description of the various parts of the device, the operation thereof may be readily understood. The cap 2 at the upper end of the upstanding tubular member 1 may be removed and water placed within the tubular member 1 until the latter is partially or completely filled. The cap 2 then is replaced. The discharge orifices of the caps 4 and 34 are relatively small and the liquid will trickle slowly through the perforations of the caps 3 and 34 into the earth adjacent to the roots of the associated plants and will percolate through the earth to the roots of the plants.

Obviously, my invention is susceptible of embodiment in forms other than that which is illustrated in the accompanying drawings and I therefore consider as my own all such modifications and adaptations of the form of the device herein described as fairly fall within the scope of the appended claims.

Having thus described the invention, what is claimed is:—

1. An irrigating device comprising an upstanding tubular member having discharge orifices of restricted area at its lower end and adapted to have the lower end portion thereof imbedded and anchored in the ground adjacent to the roots of a plant, the lower end portion of said upstanding tubular member having a laterally extending tubular discharge branch adapted to extend underneath the surface of the ground, said discharge branch having discharge orifices of restricted area, and a frame carried by said upstanding member above the surface of the ground for supporting the branches of the plant.

2. An irrigating device comprising an upstanding tubular member adapted to have a liquid introduced thereinto at the upper end thereof, said upstanding tubular member having a laterally extending branch adjacent to its lower end, the lower end portion of the upstanding tubular member and the lateral branch being adapted to be imbedded in the ground, a perforated cap fitted upon the upstanding tubular member at the lower end of the latter, and a similar cap fitted upon the lateral branch at the outer end of the latter.

HENRY ANDREW KLINGLESMITH.